US008117952B2

(12) United States Patent
Carpentier et al.

(10) Patent No.: US 8,117,952 B2
(45) Date of Patent: Feb. 21, 2012

(54) CLOSED-LOOP CUTTING SYSTEM

(76) Inventors: Benoit Carpentier, Ste-Thérèse (CA);
Gilles Pilon, Laval (CA)

( * ) Notice: Subject to any disclaimer, the term of this patent is extended or adjusted under 35 U.S.C. 154(b) by 397 days.

(21) Appl. No.: 11/687,992

(22) Filed: Mar. 19, 2007

(65) Prior Publication Data

US 2007/0215248 A1    Sep. 20, 2007

Related U.S. Application Data

(60) Provisional application No. 60/783,026, filed on Mar. 17, 2006.

(51) Int. Cl.
*B23Q 15/00*        (2006.01)
*B23Q 16/00*        (2006.01)

(52) U.S. Cl. ............... 83/74; 83/76.1; 83/76.7; 144/382

(58) Field of Classification Search ............... 83/61, 65,
83/72, 45.5, 76.4, 75.5, 73, 74, 76.6–76.9,
83/76.1, 326, 327, 289, 298, 368, 370, 809;
144/382

See application file for complete search history.

(56) References Cited

U.S. PATENT DOCUMENTS

| | | | | |
|---|---|---|---|---|
| 4,085,636 A * | 4/1978 | Eklund | ............................ | 83/56 |
| RE30,757 E * | 10/1981 | Gerber | ............................ | 83/74 |
| 4,532,840 A * | 8/1985 | Antonissen | ................... | 83/76.8 |
| 4,635,511 A * | 1/1987 | Shirasu | ............................ | 83/74 |
| 5,119,310 A * | 6/1992 | Moriya | ......................... | 700/192 |
| 6,576,531 B2 * | 6/2003 | Peng et al. | ................... | 438/460 |
| 2002/0020266 A1 * | 2/2002 | Smith | ............................. | 83/75 |
| 2006/0162518 A1 * | 7/2006 | Biggs et al. | ................. | 83/75.5 |

* cited by examiner

*Primary Examiner* — Phong Nguyen
(74) *Attorney, Agent, or Firm* — Norton Rose Canada LLP

(57) ABSTRACT

A closed-loop cutting system comprises a cutting device for cutting a piece of material at a given dimension; a positioning device for positioning the cutting means to cut the piece of material at the given dimension; a position controller for controlling the positioning device; a feedback means comprising a dimension sensor for measuring the actual dimension of the cut piece of material, the feedback means for measuring a difference between the actual dimension and the given dimension and sending signal back to either one of the positioning device and the position controller to effect an adjustment of the position of the cutting device by reducing the difference.

5 Claims, 2 Drawing Sheets

CLOSED-LOOP CUTTING SYSTEM

CROSS-REFERENCE TO RELATED APPLICATIONS

This application claims priority under 35US §119(e) of U.S. provisional patent application 60/783,026, filed on Mar. 17, 2006, the specification of which is hereby incorporated by reference.

TECHNICAL FIELD

The present description relates to the field of cutting of material. More specifically, the description relates to control systems therefor.

BACKGROUND

In the process of obtaining boards from logs, the industry uses different types of machinery. In doing so each time, the knife or the blade used to cut or face the wood, according to the level of the process or the type of machinery, is positioned according to a target dimension. To reach the target dimension, the position of the cutting device is controlled by a positioning device. The positioning device has a sensor that gives the mechanical position of the head containing the cutting device (blade or knife). Thus the positioning device will place and control the cutting device to cut at the specified target dimension.

In this process, the device is calibrated to obtain the desire target size. If you change knife, blade, make error when you calibrate it, have some play in the mechanical positioning system etc., the final dimension of the boards or processing wood is not exactly of the expected desired target size.

SUMMARY

According to an embodiment, there is provided a closed-loop cutting system which comprises: a cutting device for cutting a piece of material at a given dimension; a positioning device for positioning the cutting means to cut the piece of material at the given dimension; a position controller for controlling the positioning device; a feedback means comprising a dimension sensor for measuring the actual dimension of the cut piece of material, the feedback means for measuring a difference between the actual dimension and the given dimension and sending signal back to either one of the positioning device and the position controller to effect an adjustment of the position of the cutting device by reducing the difference.

In an embodiment, the material to be cut comprises wood. In such an embodiment, this system will check the dimension of the wood or the board that goes out of the machinery, will verify the dimension and will correct in real time the feedback of the positioning device to obtain the correct real target size. This will make a closed loop cutting system compare to what is available right now (open loop system). Presently all systems, control the position of the device and have no idea of the real dimension of the wood that goes out. According to an aspect, the present system cuts to the real target size every time regardless of the kind of controller or sensors that the machinery uses.

The gain for the sawmill industry from this system is appreciable. Presently with the technology available, many people put the target at a higher value to prevent the situation of cutting woods or boards below the final target size. When they do it, they lose a lot of potential boards by initially keeping too much fiber only to remove it at the final stage of the process.

BRIEF DESCRIPTION OF THE DRAWINGS

Further features will become apparent from the following detailed description, taken in combination with the appended drawings, in which.

DETAILED DESCRIPTION

Figure 1:
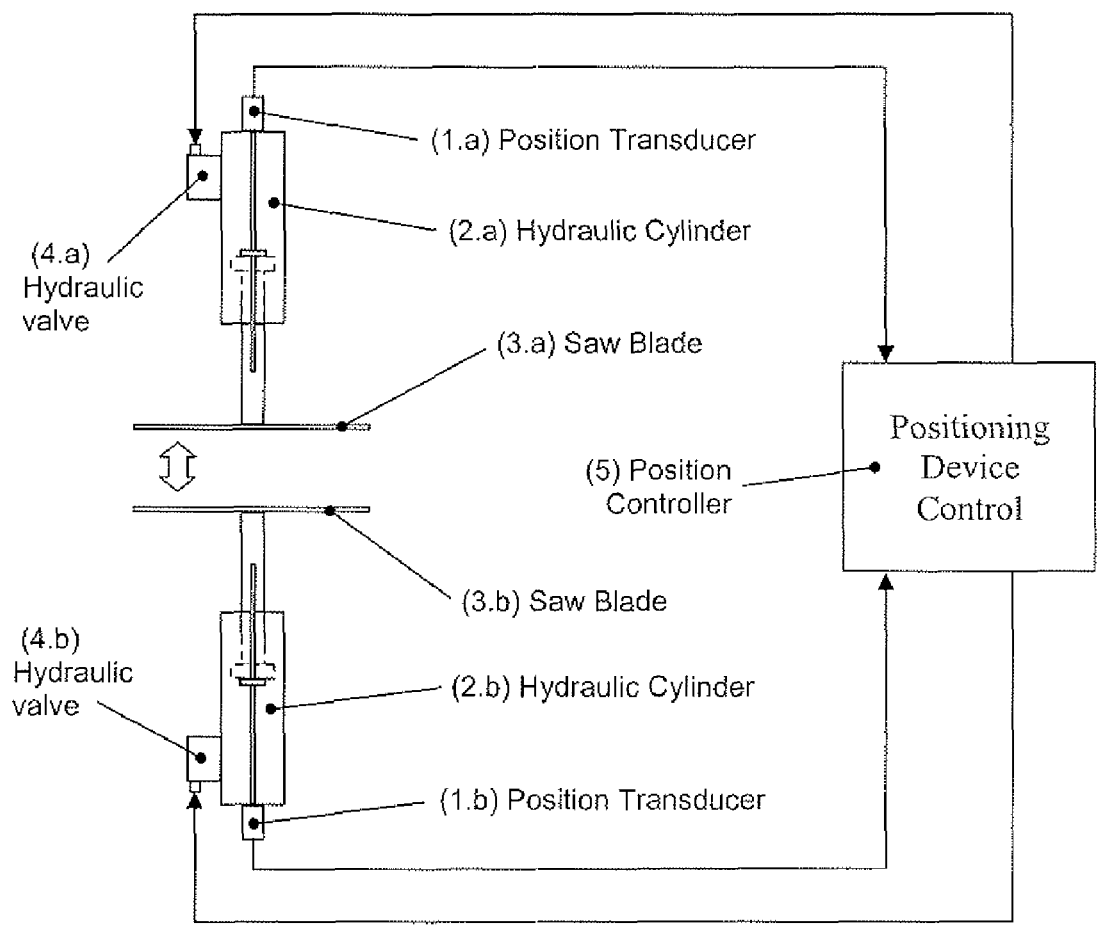
FIG. 1 is a schematic diagram showing a prior art open-loop wood cutting system.

Now referring to FIG. 1, there is described a prior art cutting system. For the purpose of the present document, the schematic will show two positioning devices. Any number of positioning devices is possible from 1 to the number of heads or blades to control.

The position transducers (1.*a*) (1.*b*) can be any kind of sensor device that gives precisely the position of an object. For the purpose of this schematic, we use a linear transducer but the cutting system is not committed to that kind of technology. The hydraulic cylinders (2.*a*) (2.*b*) and the hydraulic valve (4.*a*) (4.*b*) shown in this document are used to position the saw blades (3.*a*) (3.*b*). Positioning of the blades can be accomplished with any kind of device like DC motors, AC motors, endless screw systems, step motors, etc. The cutting system is not committed only to hydraulic cylinders (2.*a*) (2.*b*) and hydraulic valves (4.*a*) (4.*b*), but can be any kind of device that performs a similar function in the process. The saw blades (3.*a*) (3.*b*) illustrate a wood cutting device and can be any type of device that modifies, forms or dimensions wood. This is also true throughout this documentation; regardless of whether, in later figures or drawings, we show only valves or transducers, etc.

Positioning of the saw blades (3.*a*) (3.*b*) is setup by the controller (5). This controller positions hydraulic cylinders (2.*a*) (2.*b*). By placing the cylinders at the right place, the saw blades (3.*a*) (3.*b*) follow the cylinders. The feedback position is made by reading transducers (1.*a*) (1.*b*), this gives the relative position of the blades (3.*a*) (3.*b*). The position controller (5) controls the position of the hydraulic cylinders (2.*a*) (2.*b*) by applying the corresponding value to the hydraulic valves (4.*a*) (4.*b*).

In theory, the size of the cut wood after it has passed between the saw blades (3.*a*) (3.*b*) is the calculated value of the saw blade position. In this method, if a new blade is not identical to the old blade it replaces, or if calibration is poor, or if there is play in the mechanical or hydraulic parts, or because of other issues, the dimension that goes out is different compared to what is intended. This method is known as open loop cutting. Most of the time even though people control with some precision the position of the hydraulic cylinder the dimension that goes out is not what is expected.

Figure 2:
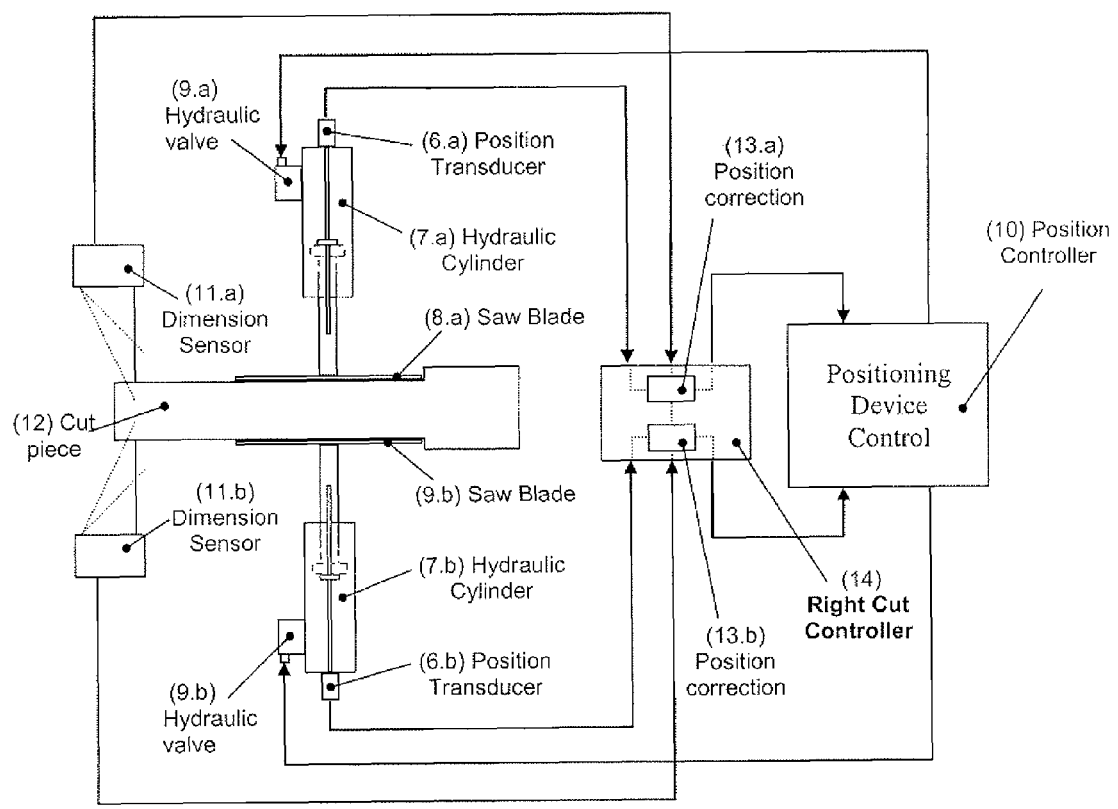
FIG. 2 is a schematic diagram showing a top view of a closed-loop wood cutting system according to an embodiment It will be noted that throughout the appended drawings, like features are identified by like reference numerals.

FIG. 2 will show a cutting system according to an embodiment.

The position of the saw blades (8.*a*) (8.*b*) is controlled by the position controller (10). It will move the hydraulic cylinders (7.*a*) (7.*b*) by controlling it with the hydraulic valves (9.*a*) (9.*b*). When compared to the open loop system, it is noted that the position transducer (6.*a*) (6.*b*) of the present cutting system is not connected to the position controller (10), but connected to the right cut controller (14). At the same time, real time dimension sensors (11.*a*) (11.*b*) are added to the process. They can be directly placed after the saw blade (8.*a*) (8.*b*) or at any location that gives the opportunity to acquire or retrieve the real final dimension of the cut piece. The acquisition can be done by any kind of device that measures with precision the piece's dimension. For example, it can be a vision system (optical) or a mechanical system.

This real dimension value of the cut piece is transmitted to the right cut controller (14). Knowing the target size for the cut piece, the right cut controller (14) analyzes the real dimension and compares it to the nearest target size. When a difference is found, the right cut controller (14) makes a correction in real time to the left side (13.*a*) or to the right side (13.*b*) or to both. A correction signal is sent to the position controller (10) from the right cut controller (14).

The position controller (10) does not know that a device (14) modifies the actual feedback position from the position transducer (6.*a*) (6.*b*). Without the presently described cutting system, the position controller (10) maintains the saw at the set target size, but the real dimension of the cut piece (12) can be anything compared to the set target size. With this cutting system, the dimension of the cut piece (12) is the set target size. If the cut piece dimension is larger or smaller than the target size, the right cut controller (14) will modify the position signal (13.*a*) (13.*b*) by the difference value between the set target size and the real dimension measured by the dimension sensors (11.*a*) (11.*b*). This new tampered position value is now sent to the position controller (10) and it will react by positioning the hydraulic cylinder (7.*a*) (7.*b*) to get its set target size. When the position controller (10) arrives at its set target size, the saw blade position will now be offset by the equivalent value added to the original position sensor (6.*a*) (6.*b*), but the real dimension of the cut piece (12) is now equal to the set target size.

This cutting system can be added to any existing device. The present cutting system modifies the existing signal feed to the position controller (10) in order to achieve at all times the set target size for the cut piece.

The modified signal can also be the signal sent from the position controller (10) to the hydraulic valves (9.*a*) (9.*b*). The principle of this cutting system stays the same. This cutting system modifies the input signal or the output signal of an existing position controller in order to achieve the set target size for the real dimension of the cut piece (12).

We claim to obtain the set target dimension for a cut piece.

This closed loop system is independent from the kind of cutting device, positioning system or position feedback. By adding this cutting system to the processing system, the set target size will always be the real dimension of the cut piece.

By altering the sensor position by the value of the error between the set target size and the real dimension of the cut piece and connecting this modified signal to the actual controller, this cutting system makes a closed loop cutting system.

The actual positioning device system will use this modified signal without knowing that the actual cutting device position has not changed. Thus the positioning device system will now position the blade to the cutting system-modified position. The result will be a piece cut to the set target dimension.

This cutting system claims to modify the position of a cutting device and obtain the set target dimension for a cut piece. This cutting system is not limited by the sensor modified feed back position.

The principles of this cutting system can be applied by modifying the control signal to position the device as well as by modifying the feedback position that goes to the positioning controller.

Modifying both signals, feedback and control, at the same time can also done and respect the same principles of operation of this cutting system.

The embodiments described above are intended to be exemplary only. The scope is therefore intended to be limited solely by the scope of the appended claims.

We claim:

1. A closed-loop cutting system comprising:
    a cutting device for cutting a piece of material at a given dimension;
    a positioning device for positioning said cutting device to out said piece of material at said given dimension;
    a positioning device controller for controlling said cutting device by sending to the positioning device a target position corresponding to a desired position of the cutting device;
    at least one dimension sensor for measuring a true dimension of the piece of material; and
    a position correction module for:
        receiving the true dimension of the piece of material and an actual position of the cutting device;
        determining a difference between the true dimension and a target dimension of the piece of material for the actual position of the cutting device; and
        modifying a signal corresponding to the actual position of the cutting device to correspond to a new position to compensate for the difference and sending the new position signal to the positioning device controller, whereby the positioning device controller is not aware of the new position and treats the new position as it would the actual position;
    wherein said at least one dimension sensor measures said piece of material after cutting and returns said actual dimension in real time, and said position correction module modifies the signal corresponding to the actual position in real time.

2. The closed-loop cutting system of claim 1, wherein said positioning device comprises a pair of hydraulic cylinders and a pair of hydraulic valves.

3. The closed-loop cutting system of claim 1, wherein said cutting device comprises a pair of saw blades.

4. The closed-loop cutting system of claim 1, wherein the at least one dimension sensor is an optical vision sensor.

5. The closed-loop cutting system of claim 1, wherein said position correction module comprises a left side position correction device and a right side position correction device, each one corresponding to a respective side of said cutting device.

* * * * *